United States Patent [19]
Belleride et al.

[11] Patent Number: 4,931,612
[45] Date of Patent: Jun. 5, 1990

[54] DEVICE FOR FORMING A CLOSED CHAMBER INSIDE TOW METAL PIPES TO BE CONNECTED TOGETHER BY ARC WELDING UNDER A PROTECTIVE GAS

[75] Inventors: Paul Belleride, Montigny en Gohelle; Maurice Duhamel, Toufflers, both of France

[73] Assignee: Societe Anonyme dite : Stein Industrie, Velizy-Villacoublay, France

[21] Appl. No.: 330,579

[22] Filed: Mar. 30, 1989

[51] Int. Cl.$^5$ ............................................. B23K 9/32
[52] U.S. Cl. ...................................... 219/60 R; 138/90; 219/136
[58] Field of Search ................... 219/60 R, 61, 136, 74; 138/90

[56] References Cited

U.S. PATENT DOCUMENTS

| | | | |
|---|---|---|---|
| 3,194,466 | 7/1965 | Davis | 738/90 |
| 3,387,761 | 6/1968 | Pickard | 219/60 R |
| 3,424,887 | 1/1969 | Fehlman | 219/60 R |
| 4,101,067 | 7/1978 | Sloan et al. | 228/222 |

*Primary Examiner*—Clifford C. Shaw
*Attorney, Agent, or Firm*—Sughrue, Mion, Zinn, Macpeak & Seas

[57] ABSTRACT

A device for forming a closed chamber inside a set of two metal pieces of pipework (1) to be interconnected by arc welding under a protective gas, the device comprising a first hollow element made of elastomer disposed inside the first piece of pipework and a second hollow element made of elastomer disposed inside the second piece of pipework, both hollow elements being inflatable to close the corresponding piece of pipework. Each of the hollow elastomer elements comprises a toroidal inflatable tube (2) having a disk (3) fixed to the internal equatorial meridian thereof by gluing, said disk withstanding the pressure difference between the ambient atmosphere and the desired internal pressure inside the closed chamber, said disk being of a proper diameter necessary to cause the zone of the inflatable tube adjacent to said internal equatorial meridian to be concave.

8 Claims, 2 Drawing Sheets

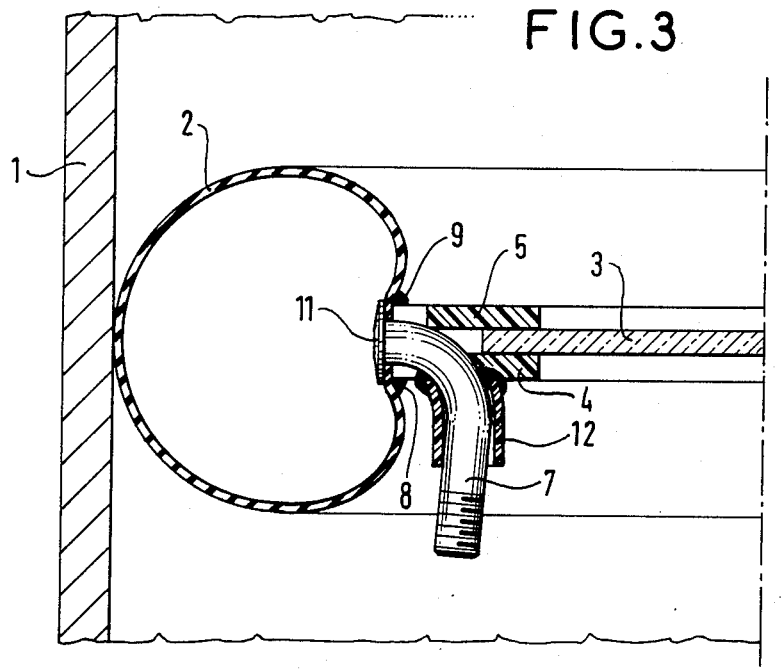
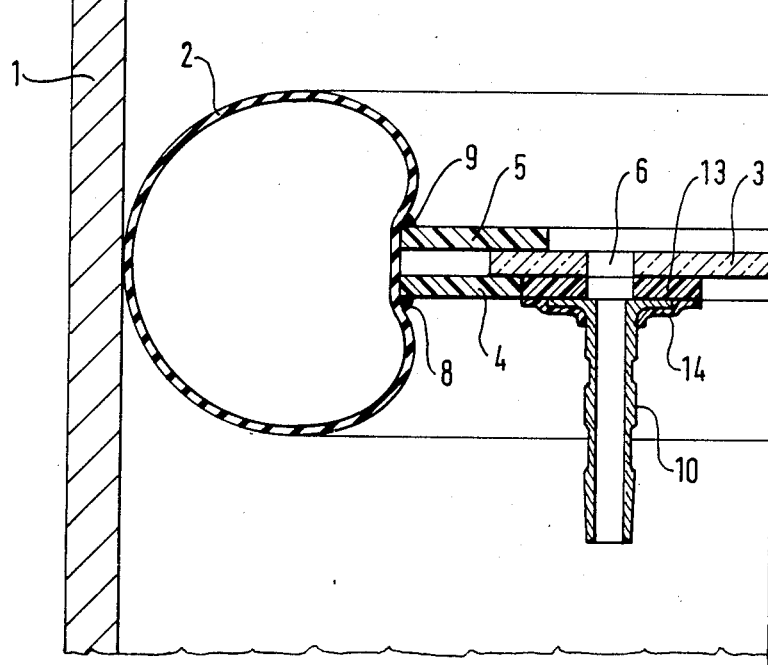

DEVICE FOR FORMING A CLOSED CHAMBER INSIDE TOW METAL PIPES TO BE CONNECTED TOGETHER BY ARC WELDING UNDER A PROTECTIVE GAS

The present invention relates to a device for forming a closed chamber inside a set of two metal pieces of pipework to be interconnected by arc welding under a protective gas, the device comprising a first toroidal inflatable tube made of elastomer disposed inside the first piece of pipework and a second toroidal inflatable tube made of elastomer disposed inside the second piece of pipework, both tubes being inflated to close the corresponding piece of pipework, and each tube being carried by a circular support element capable of withstanding the pressure difference between the ambient atmosphere and the desired internal pressure.

GB-A-1 404 467 describes a device for forming a closed chamber between two pieces of pipework for welding together by means of an arc under argon gas, the device comprising two elements having inflatable peripheries in the form of inflatable tubes, each carried on a steel rim, with the two rims being rigidly interconnected by a bar and being pierced by holes for injecting or exhausting gas into or out from the chamber. Such a device enables welding to be performed only on pieces of rectilinear pipework disposed in line, it is relatively heavy and it does not allow the rear side of the weld fillet to be observed, such that any welding defect is seen only after the welding operation has been completed.

The object of the present invention is to provide a device enabling chambers to be formed for protecting the weld zone between two pieces of different diameter metal pipework, even if not rectilinear, with the device being relatively lightweight, simple in structure, and cheap, and also making it possible, where appropriate, for the welder to observe the rear side of the weld fillet.

The device of the invention is characterized in that the circular support element is a disk having its periphery glued to the internal equatorial meridian of the corresponding inflatable tube being of a thickness less than the diameter of the tube when inflated and of a proper diameter necessary to cause the zone of the inflatable tube adjacent to said internal equatorial meridian to be concave.

The invention preferably also presents at least one of the following features:
the disk capable of withstanding the pressure difference is glued via its margins on both sides to respective elastomer washers which are in turn glued along circular glue lines and vulcanized on the toroidal inflatable tube in the vicinity of its equatorial meridian;
the disk capable of withstanding the pressure difference is made of a transparent material;
the transparent material is polymethyl methacrylate;
each of the disks is pierced by a hole connected to an endpiece for injecting or exhausting a protective gas for the rear of the weld fillet; and
the, or each, glue line at the junction between the disk and the inflatable tube is capable of withstanding heat.

An element of a device for closing a piece of pipework in the vicinity of its end to be welded end-on to the end of another piece of pipework is described below by way of example and with reference to the figures in the accompanying drawings.

FIG. 3 is a half section on axis III of FIG. 1, going through the inflation valve of the element.

FIG. 4 is a half section on axis IV of FIG. 1 going through the endpiece for injecting or exhausting protection gas for the rear of the weld fillet.

Figure 1:
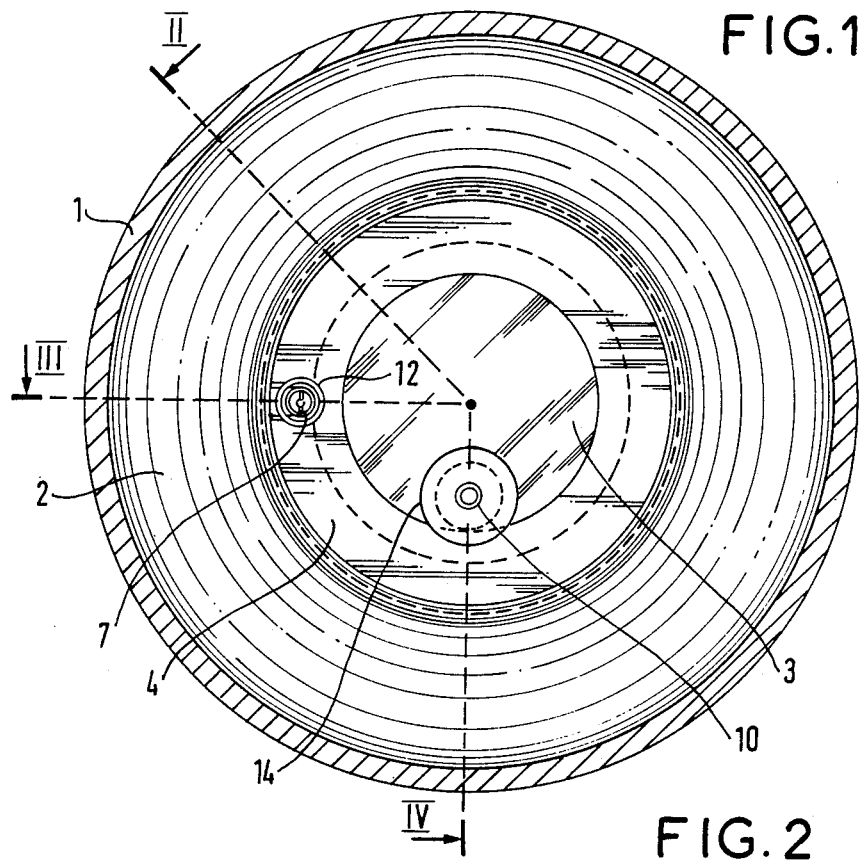
FIG. 1 shows a closure element in elevation inside the pipework.
Figure 2:
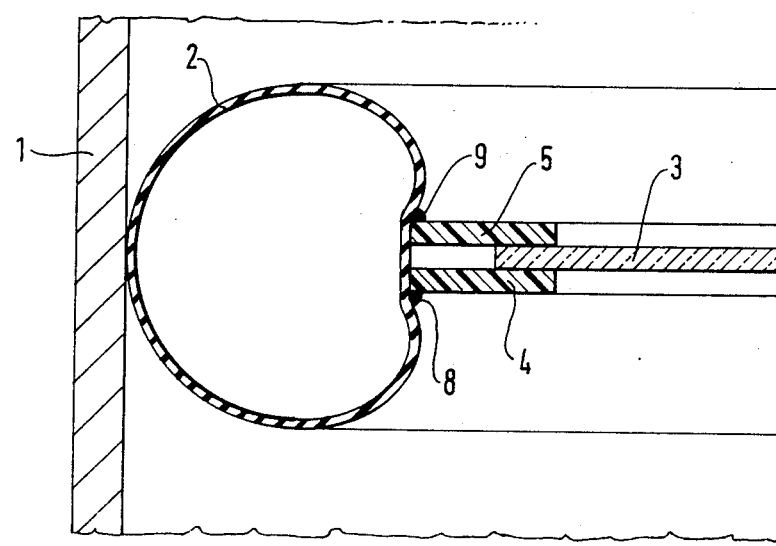
FIG. 2 is a half section on axis II of FIG. 1.

In FIGS. 1 and 2, the closure element is disposed inside a piece of pipework 1. Its periphery is constituted by a commercially available inflatable inner tube 2 for a car, and provided with an inflation valve 7.

The central zone is closed by a transparent disk 3 of polymethyl methacrylate whose edge is glued between two elastomer washers 4 and 5 by means of a glue that withstands heat. The washers 4 and 5 are themselves glued at circular glue lines to the inflatable tube in the vicinity of its internal equatorial meridian via fillets 8 and 9 of glue that withstands heat. The disk 3 is pierced by a hole 6 for passing protective gas to protect the rear of the weld fillet and an endpiece 10 is applied thereto.

A zone of the inflatable tube on either side of its outer equatorial meridian bears against the inside wall of the pipework, thereby providing sealing. Due to the thickness of the disk being less than the diameter of the tube and the proper diameter of the disk, under the effect of pressure, the internal zone of the inflatable tube takes up a slightly concave shape in the vicinity of the central disk about the disk periphery.

The valve 7 for inflating the inflatable tube is shown in greater detail in FIG. 3. It includes a non-return valve 11 for inflation purposes and it passes through the elastomer washer 4 inside a flexible tube 12.

In FIG. 4, the crenellated brass endpiece 10 through which the protective gas passes is fixed to the disk 3 over facing hole 6 by means of a thick rubber washer 13. The foot of the endpiece is fixed to the washer 13 by a thin flexible washer 14. The washer 13 is glued around the periphery of the hole 6, and the endpiece 10 together with the flexible washer 14 are glued together onto the thick washer 13.

The above-described device serves to isolate the zone of the pipework 1 close to the weld fillet from the ambient atmosphere, and to cause an adjustable flow of protective gas such as argon to pass over the rear side of the weld. In addition, the welder can observe the rear side of the weld fillet by looking through the disk of polymethyl methacrylate and can therefore verify both the penetration and the appearance thereof. When the pipework is to be closed relatively close to the weld fillet, it is possible to place a refractory coating on the periphery of the inflatable tube over the zone thereof which comes into contact with the pipework.

If an end-to-end connection is to be made between two pieces of pipework whose diameters are not the same, but are not very different, the same device can be used by inflating its inflatable tube to a greater or lesser pressure.

Tests have shown that sealing can be provided in practice in the proximity of welds for pipework with diameters lying in the range 220 mm to 1100 mm with a set of only five different sizes of inflatable tube.

The invention is applicable to welding rectilinear lengths of pipework end-to-end, or to welding a seat onto pipework. It can even be applied to bent pipework by providing, where necessary, a cable for deflating the inflatable tube in order to withdraw the pipework closure device through the bent zone.

We claim:

1. A device for forming a closed chamber inside a set of two metal pieces of pipework (1) to be interconnected by arc welding under a protective gas, the device comprising a first hollow element made of elastomer disposed inside the first piece of pipework and a second hollow element made of elastomer disposed inside the second piece of pipework, both hollow elements being inflatable to close the corresponding piece of pipework, the device being characterized in that each of the hollow elastomer elements comprises a toroidal inflatable tube (2) having a disk (3) with a disk periphery glued to the internal equatorial meridian thereof, said disk withstanding the pressure difference between the ambient atmosphere and the desired internal pressure inside the closed chamber, said disk being of a thickness less than the diameter of the inflatable tube and being of a proper diameter in relation to the inner diameter of the toroid made up by the inflatable tube to cause the zone of the tube adjacent to said internal equatorial meridian when inflated to be concave about the periphery of the disk.

2. A device according to claim 1, characterized in that the disk (3) capable of withstanding the pressure difference is glued via its margins on both sides to respective elastomer washers (4, 5) which are in turn glued and vulcanized on the toroidal inflatable tube (2) in the vicinity of its equatorial meridian.

3. A device according to claim 2, characterized in that the disk capable of withstanding the pressure difference is made of a transparent material.

4. A device according to claim 3, characterized in that the transparent material is polymethyl methacrylate.

5. A device according to claim 2, characterized in that each glue line at the junction between a respective elastomer washer and the inflatable tube is capable of withstanding heat.

6. A device according to claim 1, characterized in that the disk capable of withstanding the pressure difference is made of a transparent material.

7. A device according to claim 6, characterized in that the transparent material is polymethyl methacrylate.

8. A device according to claim 1, characterized in that each of the disks is pierced by a hole (6) connected to an endpiece (10) for injecting or exhausting a protective gas for the rear of the weld fillet.

* * * * *